(12) United States Patent
Eberhardt

(10) Patent No.: US 11,230,356 B2
(45) Date of Patent: Jan. 25, 2022

(54) DEVICE FOR PRODUCING A STERN WAVE ON A WATERCRAFT, USE OF A DEVICE, WATERCRAFT HAVING A DEVICE, AND METHOD FOR USING A DEVICE

(71) Applicant: Eberhardt Boote GmbH, Groß-Umstadt (DE)

(72) Inventor: Jürgen Eberhardt, Groß-Umstadt (DE)

(73) Assignee: Eberhardt Boote GmbH, Groß-Umstadt (DE)

( * ) Notice: Subject to any disclaimer, the term of this patent is extended or adjusted under 35 U.S.C. 154(b) by 0 days.

(21) Appl. No.: 16/955,146

(22) PCT Filed: Dec. 17, 2018

(86) PCT No.: PCT/DE2018/000370
§ 371 (c)(1),
(2) Date: Jun. 18, 2020

(87) PCT Pub. No.: WO2019/120350
PCT Pub. Date: Jun. 27, 2019

(65) Prior Publication Data
US 2020/0385092 A1     Dec. 10, 2020

(30) Foreign Application Priority Data

Dec. 18, 2017  (DE) ..................... 10 2017 011 676.8

(51) Int. Cl.
*B63B 34/75*   (2020.01)
(52) U.S. Cl.
CPC ................... *B63B 34/75* (2020.02)

(58) Field of Classification Search
CPC ........................................ B63B 34/75
See application file for complete search history.

(56) References Cited

U.S. PATENT DOCUMENTS

| 1,196,682 A | 8/1916 | Harriss | |
| 3,496,899 A * | 2/1970 | Weber | B63B 39/061 |
| | | | 114/287 |
| 5,813,357 A * | 9/1998 | Watson | B63H 25/44 |
| | | | 114/145 R |

(Continued)

FOREIGN PATENT DOCUMENTS

| CA | 2271332 A1 | 2/2000 |
| WO | 2013071148 A1 | 5/2013 |

*Primary Examiner* — Stephen P Avila
(74) *Attorney, Agent, or Firm* — Smartpat PLC

(57) ABSTRACT

The invention relates to a device for producing a stern wave on a watercraft, in particular a sports boat, for wakesurfing and/or wakeboarding on the stern wave, comprising at least one pivoting deflector that can be pivoted out laterally, in particular respectively on a right-hand and left-hand lateral region of the hull of the watercraft, having an arranging means, in particular hinge means, on a lateral hull region of the watercraft, in particular in the region of the stern, wherein a stern wave for wakesurfing and/or wakeboarding can be formed by the pivoting deflector in the pivoted-out state, and an integration region for the pivoting deflector in the lateral hull region of the watercraft, such that the hinge means is substantially integrated in the hull region of the watercraft in the pivoted-in stage, to adapt and/or continue a hull outer line in the lateral hull region of the watercraft.

14 Claims, 7 Drawing Sheets

(56) References Cited

U.S. PATENT DOCUMENTS

| | | | |
|---|---|---|---|
| 6,684,807 B1* | 2/2004 | Smith | B63B 1/22 |
| | | | 114/285 |
| 9,540,074 B1 | 1/2017 | Pigeon | |
| 2013/0228113 A1 | 9/2013 | Gasper et al. | |
| 2014/0261135 A1* | 9/2014 | Gasper | G08G 3/00 |
| | | | 114/284 |

* cited by examiner

DEVICE FOR PRODUCING A STERN WAVE ON A WATERCRAFT, USE OF A DEVICE, WATERCRAFT HAVING A DEVICE, AND METHOD FOR USING A DEVICE

TECHNICAL FIELD

The invention is related to a device for producing a stern wave on a watercraft, a watercraft having such a device, and a method for producing a stern wave.

BACKGROUND

Water sport boats for use as wakesurfing boats comprise bathing platforms with flaps arranged on them for unfolding, whereby water waves can be generated when driving the boat. These flaps have various limitations due to the boat parameters, such as restrictions to avoid falls or other injuries on the platform due to the adjacent flap or restrictions on wave production with appropriate ballast loading.

The goal of the present invention, while avoiding the disadvantages of the prior art, is to provide a simple and safe device for the generation of a variable stern wave.

SUMMARY

The problem is solved by a device for producing a stern wave on a watercraft, in particular a sports boat, for wakesurfing and/or wakeboarding on the stern wave, comprising at least one pivoting deflector which can be pivoted out laterally, in particular respectively on a right-hand and left-hand lateral region of the hull of the watercraft, having an arrangement means, in particular hinge means, on a lateral hull region of the watercraft, in particular in the region of the stern, wherein a stern wave for wakesurfing and/or wakeboarding can be formed by the pivoting deflector in the pivoted-out state and an integration region for the pivoting deflector in the lateral hull region of the watercraft, such that the pivoting deflector is substantially integrated in the hull region of the watercraft in pivoted-in stage to adapt and/or continue a hull outer line in the lateral hull region of the watercraft.

Thanks to the device, a very high and variably adjustable wakesurfing and wakeboarding wave can be generated without any risk for the user, which can also meet extreme conditions of use, for example by adjusting the boat and/or adjusting the height of the pivoting deflector. The pivoting deflector and thus the displaced water can be considerably larger than in the state of the art and thus a larger stern wave is ensured at the same boat speed. A smaller pivoting angle or range is now required for the production of a state-of-the-art wave, whereby, for example, faster changes of direction or side changes of the user on the board in relation to the generated wave are possible. The pivoting deflector may include, for example, wood and/or aluminium and/or metal and/or a composite and/or plastic; the pivoting deflector can be designed in a variety of ways, one-piece or multi-piece, as well as solid and/or elastic.

It is advantageous, if that the pivoting deflector is fully integrated into the lateral hull region when it is in pivoted-in stage. The region below the lateral hull region would also be included in this context, which is not essentially parallel downwards, in particular about 30° as a hull bending.

It is advantageous, if the pivoting deflector is positioned at a lateral height in such a way that the water line at the lateral hull region depends on height parameters, in particular the state of loading and/or filling of ballast tanks and/or the speed of travel of the watercraft, essentially between an upper edge of the pivoting deflector and a lower edge of the pivoting deflector the actuating means, in particular a linear cylinder, is positioned in the watercraft, especially the sports boat, with a actuating joint means, and an actuating pass through for the transmission of an operating range of the actuating means through the integration region for the pivoting deflector in the lateral hull region to the pivoting deflector. With the help of the arrangement of the actuator means inside the hull region, extensive water contact is avoided, space is saved, so that a flush integration of the pivoting deflector can take place in the integration region and any repairs and adjustments can be easily carried out.

It is advantageous, if at least one actuating means is provided for lateral pivoting, in particular a linear cylinder, which is positioned in particular at the hull and/or retractable into the hull, and/or a volumetrically variable bellows cylinder, which is located at the hull region.

It is advantageous, if the pivoting deflector has at least two partial pivoting deflectors, with a spacing region between the partial pivoting deflectors, arranged vertically and/or horizontally.

It is advantageous, if the pivoting deflector comprises a solid and/or flexible material, in particular an elastic plastic, so that the pivoting deflector is bendable to the outside.

It is advantageous, if the pivoting deflector can be pivoted out at a pivoting angle of up to about 45° or more than 45°.

It is advantageous, if the upper edge of the pivoting deflector is sufficiently formed to approximately one upper edge of the hull region.

It is advantageous, if the pivoting deflector and/or the actuator, in particular the actuating joint means and/or linear cylinders and/or cylinder means and/or piston rod and/or the actuating actuator and/or the operating range and/or the hull surface and/; or the actuating bracket and/or a pivoting deflector bracket and/or a transition region of an articulated compound one or more means of detecting a force and/or changing the force and/or tilt angle and/or changing the pivoting angle and/or a position and/or changing a position and/or a path and/or a path and/or a slope and/or a change of inclination, in particular a change of direction of the force, is established, where the means of detecting a force and/or changing a force measures a tensile force and/or a pressure on the medium and/or the means encompasses a sensor device, in particular a strain sensor and/or a photoelectric sensor, in particular a photocell and/or angle sensor and/or displacement sensor, and/or displacement probe and/or a photoelectric sensor, In particular, a photocells, and/or potentiometric resistors, and/or laser means, and/or optical measuring devices, and/or a mechanical switch and/or a film sensor, including, in particular, a message to a means of recording and/or evaluating and/or processing a measurement result, in particular to an interface.

A method of using for producing a stern wave on a watercraft, in particular a sports boat, for wakesurfing and/or wakeboarding on the stern wave, provides a device comprising a laterally pivoting deflector, with an alignment means, in particular hinge, on a lateral hull region of the watercraft, in particular in the area the stern, where a stern shaft for wakesurfing and/or wakeboarding is to be formed by the pivoting deflector in the waved state, and an integration zone for the pivoting deflector in the lateral hull region of the watercraft, so that the pivoting deflector in the pivoted-in stage is essentially integrated into the hull region of the watercraft, for adaptation and/or continuation of a hull outline in the lateral hull region of the watercraft.

Further features and advantages of the invention arise from the claims and the following description, in which embodiments of the subject-matter of the invention in connection with the drawings are explained in more detail.

DETAILED DESCRIPTION

Figure 1:
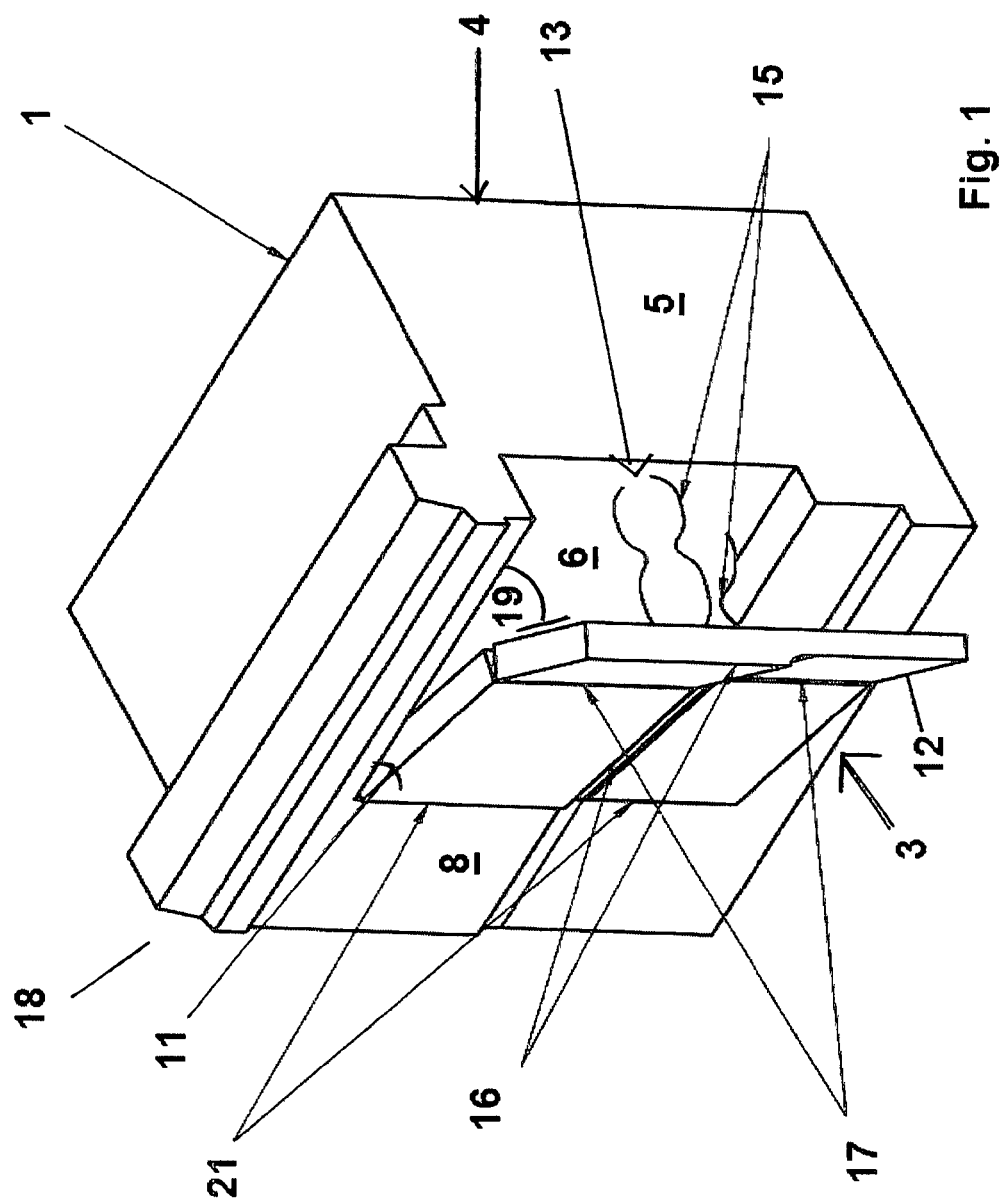
FIG. 1 shows a device for producing a stern wave on a watercraft.
Figure 2:
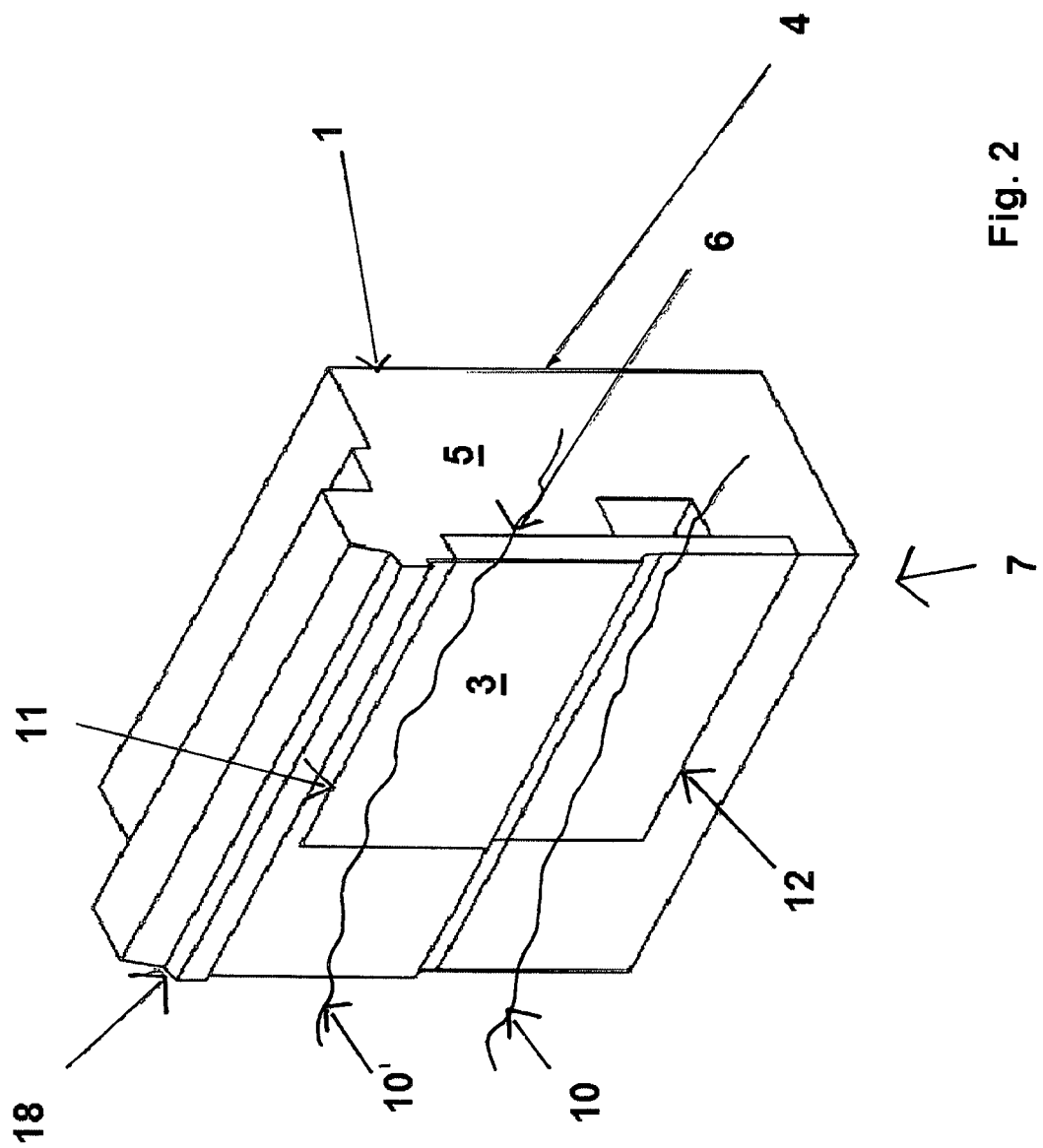
FIG. 2 shows a device for producing a stern wave.
Figure 3:
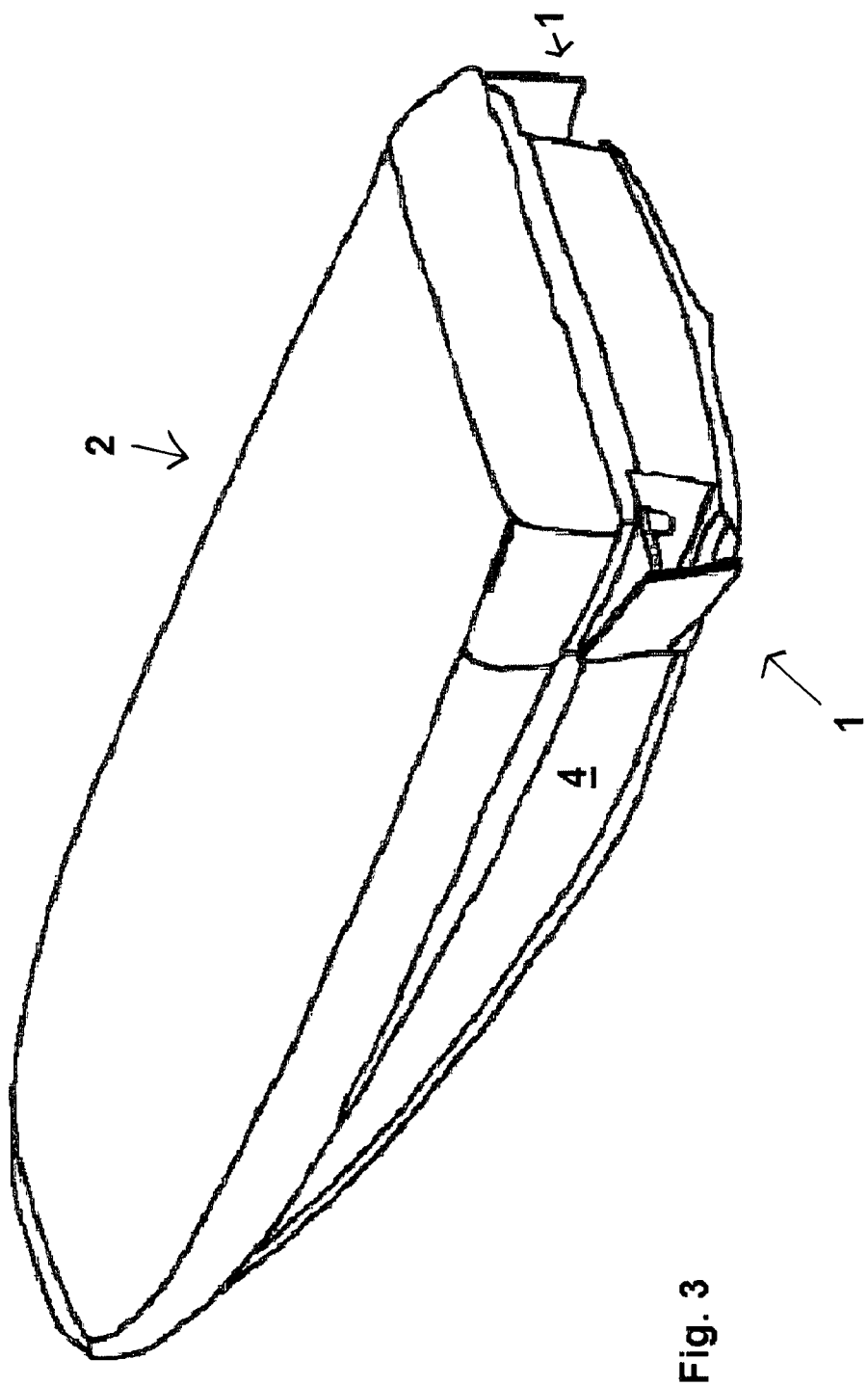
FIG. 3 shows a device for producing a stern wave with hull of a boat.

FIG. 1 shows a device 1, especially integrated in a hull of a boat, as shown in example in FIG. 3, for producing a stern wave as part of on a watercraft, which is not shown, in particular a sports boat, for wakesurfing and/or wakeboarding on the stern wave of the watercraft, comprising at least one pivoting deflector 3 which can be pivoted out laterally, having an arrangement means 21, in particular hinge means, on a lateral hull region 4 of the watercraft, in particular in the region of the stern 5, wherein a stern wave for wakesurfing and/or wakeboarding can be formed by the pivoting deflector 3 in the pivoted-out state and an integration region 6 for the pivoting deflector 3 in the lateral hull region 4 of the watercraft 2, such that the pivoting deflector 3 is substantially integrated in the lateral hull region 4 of the watercraft 2 in pivoted-in stage, to adapt and/or continue a hull outer line 8 in the lateral hull region 4 of the watercraft 2, wherein the pivoting deflector 3 is fully integrated in the lateral hull region 4 in the pivoted-in stage 7, as exemplarily in FIG. 2, whereas for lateral pivoting a actuating means 13 is provided, especially a linear cylinder 14, as presented I FIG. 3, and/or a volumetrically variable bellows cylinder 15, which is provide at the hull region 4 and the pivoting deflector 3 is pivotable in a pivoting angle 19 of up to about 45°.

FIG. 2 shows a device for producing a stern wave in a pivoted-in stage; wherein the pivoting deflector 3 is folded into the integration range. The pivoting deflector 3 is positioned at a lateral height 9 in such a way that the water line 10 at the lateral hull region 4 depends on height parameters, in particular the state of loading and/or filling of ballast tanks, arranged essentially between an upper edge 11 of the pivoting deflector 3 and a lower edge 12 of the pivoting deflector 3 the actuating means 13. In a deeper state of loading the water line 10 can perform as the water line 10', the upper edge 11 of the pivoting deflector 3 provided reaching up to the upper edge 18 of the hull region 4.

FIG. 3 shows a device 1 for producing a stern wave in the hull region 4 with a schematic presentation of the hull of the boat.

Figure 4:
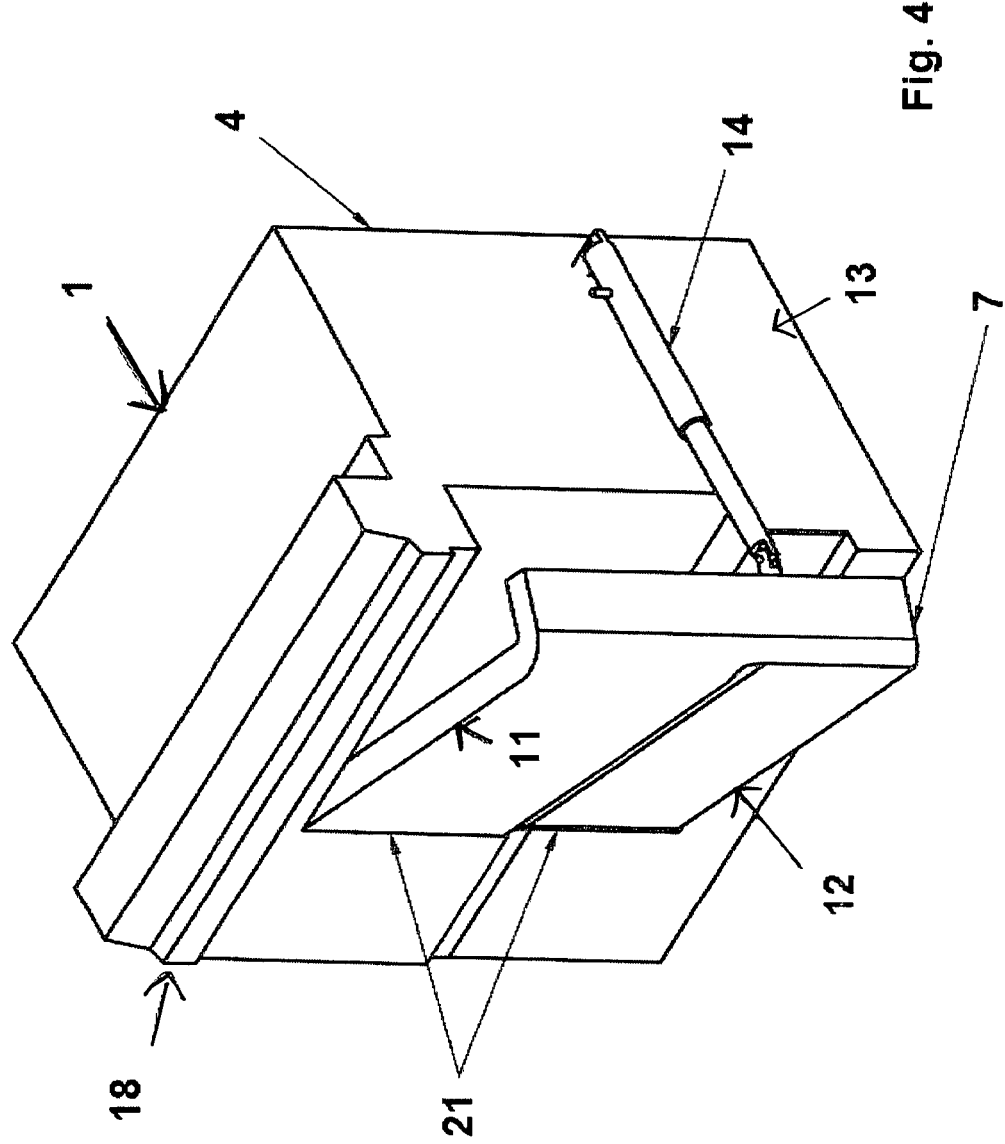
FIG. 4 shows a linear cylinder device for producing a stern wave.
Figure 5B:
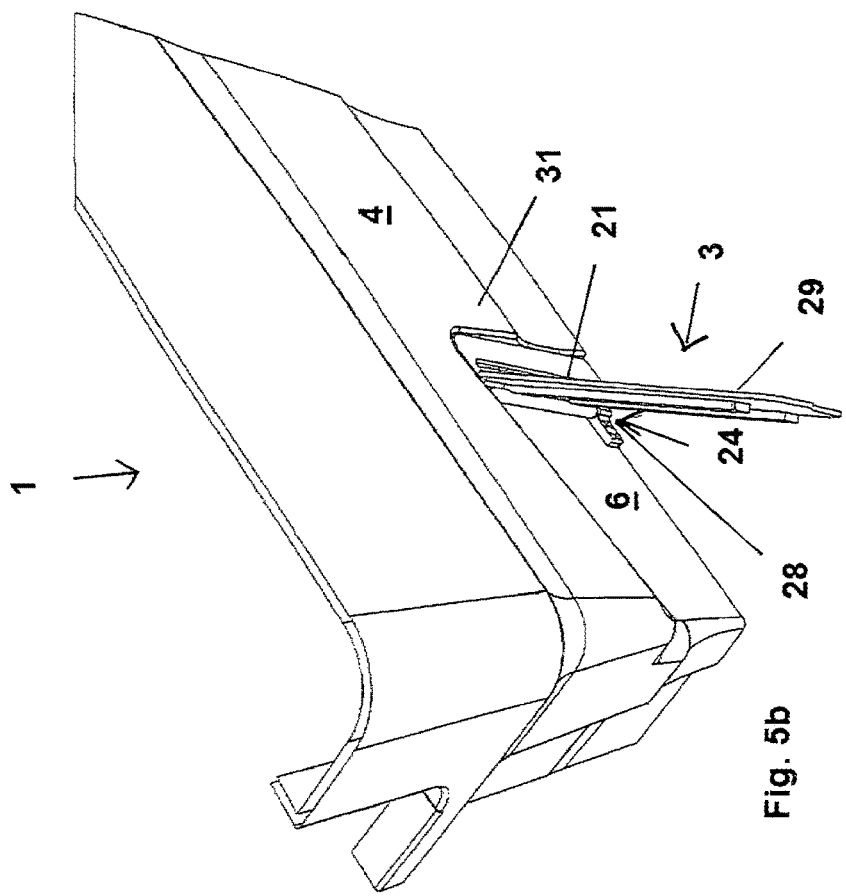
FIG. 5b shows a device for producing a stern wave with hull of a boat.
Figure 5A:
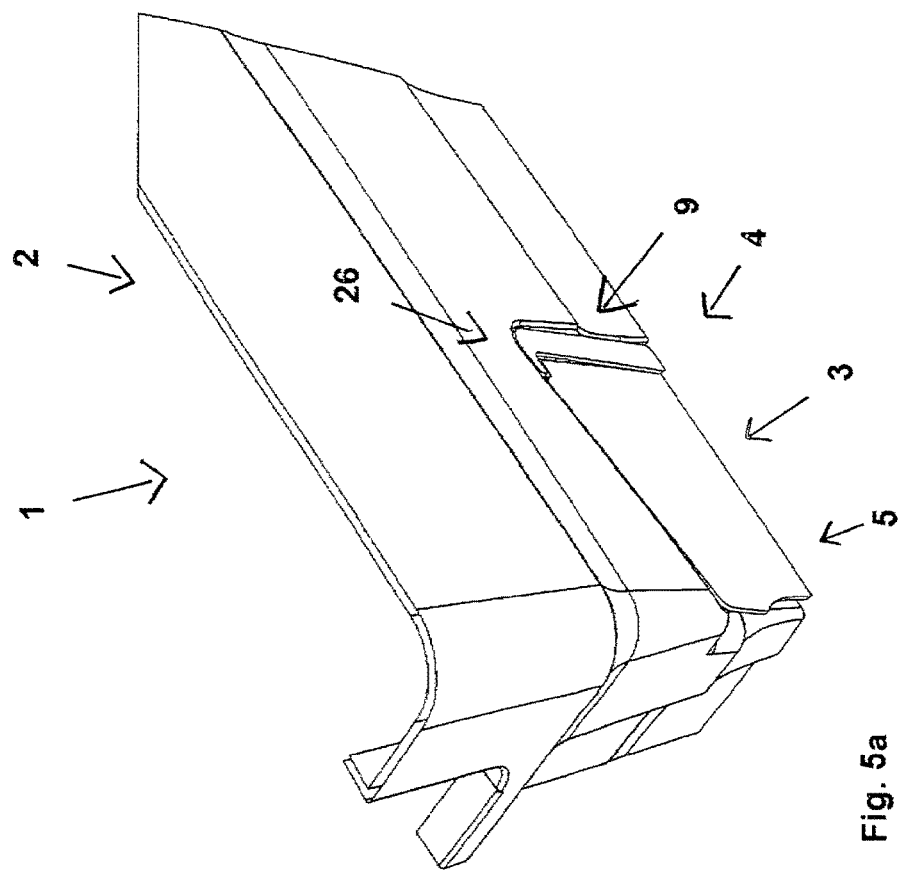
FIG. 5a shows a device for producing a stern wave with hull of a boat.

FIG. 4 shows a device 1 for producing a stern wave in the hull region 4 with a linear cylinder 14, arranged in the side of the hull, as in example shown in FIG. 3, whereas the pivoting deflector 3, with the upper edge 11 and the lower edge 12, with the predetermined measure extending over the back hull region FIG. 5a shows a device 1 for producing a stern wave with hull region 4 of a watercraft 2 at the stern 5, whereby a pivoting deflector 3 is integrated into an integration region 6 at the hull region 4, so that a hull surface 26 essentially passes over the pivoting deflector 3.

Figure 7:
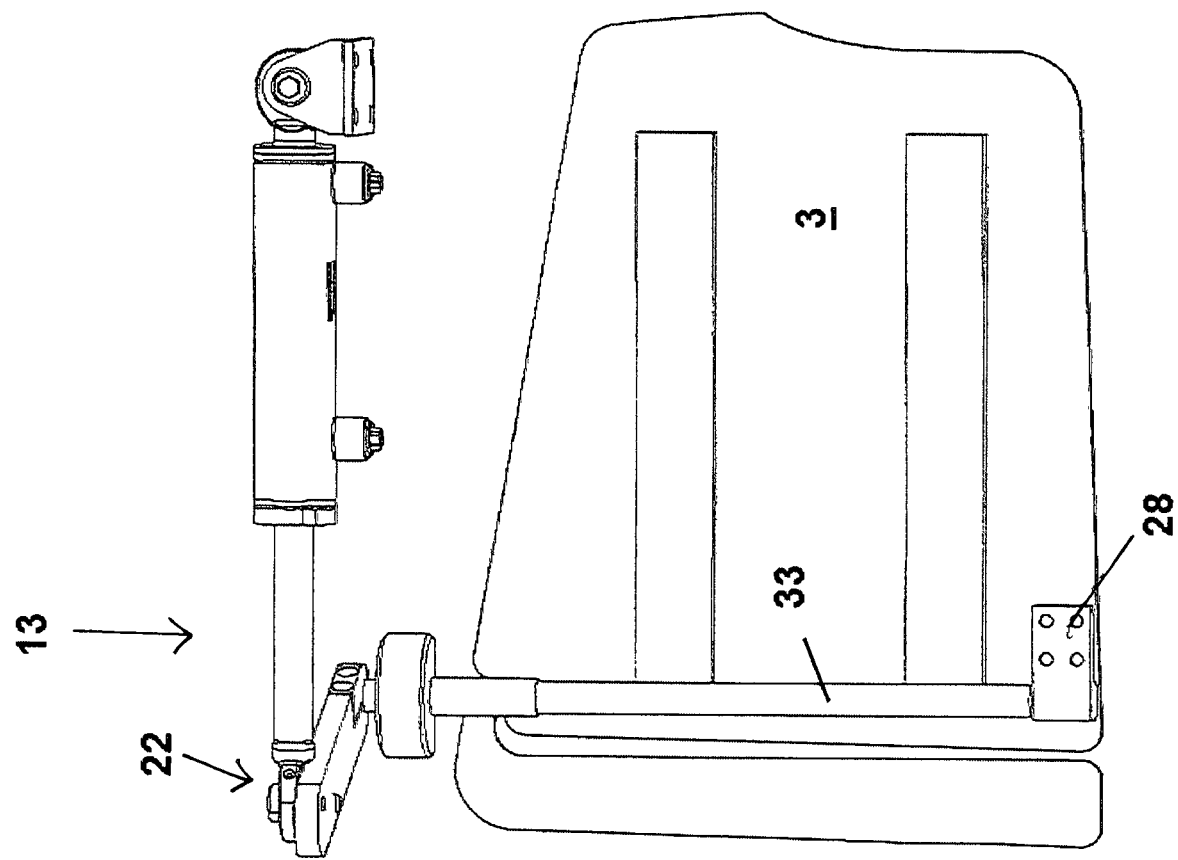
FIG. 7 a shows a device for producing a stern wave.

FIG. 5b shows a device for producing a stern wave with a hull region 4 at the stern 5, whereas the pivoting deflector 3 is integrated in an integration range 6 and with the help of an actuating means 13 at the actuating region 24 is pivotable at an arrangement means 21. A pivot means connection 22 at the actuating means 13, is advantageously connectable in different angle positions. At the pivoting deflector 3 an actuating means for connection of the actuating means 13 is adapted, as shown in FIG. 7 in example. In a transition region 31 an overlapping or a jointed hull connection is between hull of the boat 4 and pivoting deflector 13, which leads to a smoother flow so that less turbulences occur, especially solid and/or flexible material, in particular an elastic plastic and/or rubber and/or GRP and/or CFRP and/or wood and/or metal and/or aluminium. The device can be arranged at the actuator 13, in particular the actuating joint means 22 and/or linear cylinders 14 and/or arrangement means 21 and/or position and/or slope and/or change of position of a slope and/or change of slope and/or of the actuation pass through 23 and/or actuation range 24 and/or surface of the hull 26 and/or actuating bracket 28 and/or pivoting deflector bracket 29 and/or transition region 31 of a joint means connection. The device can advantageously comprise a means for registration of a path and/or force and/or angle, whereas a means for registration of a path and or changement of the path, force and/or changement of the force, angle and/or changement of the angle can be provided. The means can especially comprise a sensor device, in particular a strain sensor and/or an angle sensor and/or measuring means and/or magnetic sensors and/or displacement sensors and/or displacement sensors and/or a light barrier, in particular, a photocell and/or potentiometer resistance systems and/or a laser device and/or an optical measuring system and/or a film sensor, in particular a sensor signal and/or a control signal to a means of recording and/or evaluation and/or processing, in particular to an interface.

Figure 6A:
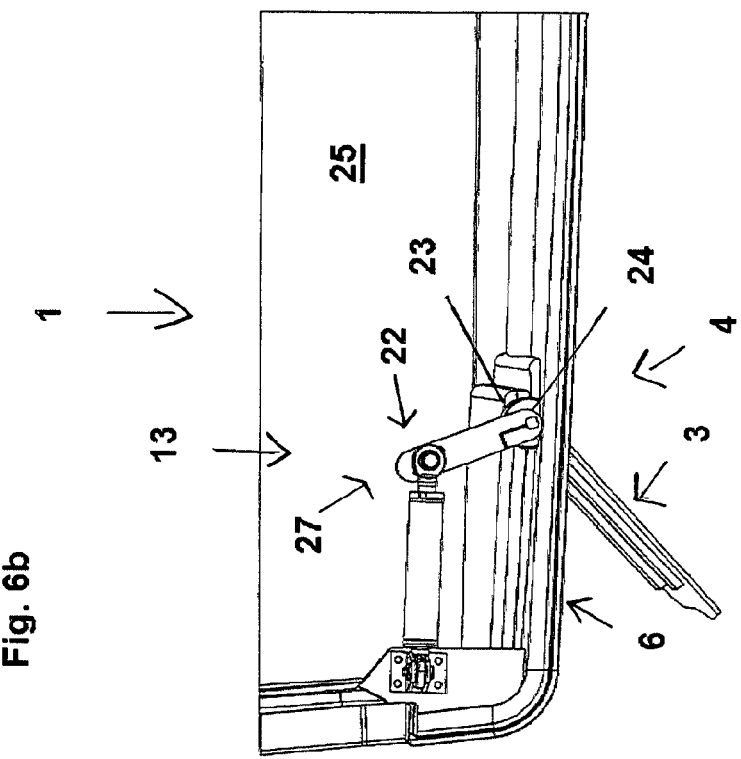
FIG. 6a shows a device for producing a stern wave with hull of a boat.

FIG. 6a shows a device for producing a stern wave in hull region 4 at stern 5 in supervision. An actuating means 13 with a linear cylinder 14, in particular as a hydraulic cylinder with a cylinder means 30 and a piston rod 34, and an exemplary actuator joint means 22 which can be fixed in various positions, is located in an interior region 25 of the watercraft 2, so that water contact is avoided, space is saved and possible repairs and adjustment changes can be carried out easily. The actuator 13, which is attached to a shaft 33 on the pivoting deflector 3, is guided by an actuator pass through 23 in the hull region 4, which is sealed against water ingress, up to an actuator region 24, which is located on the pivoting deflector 3.

Figure 6B:
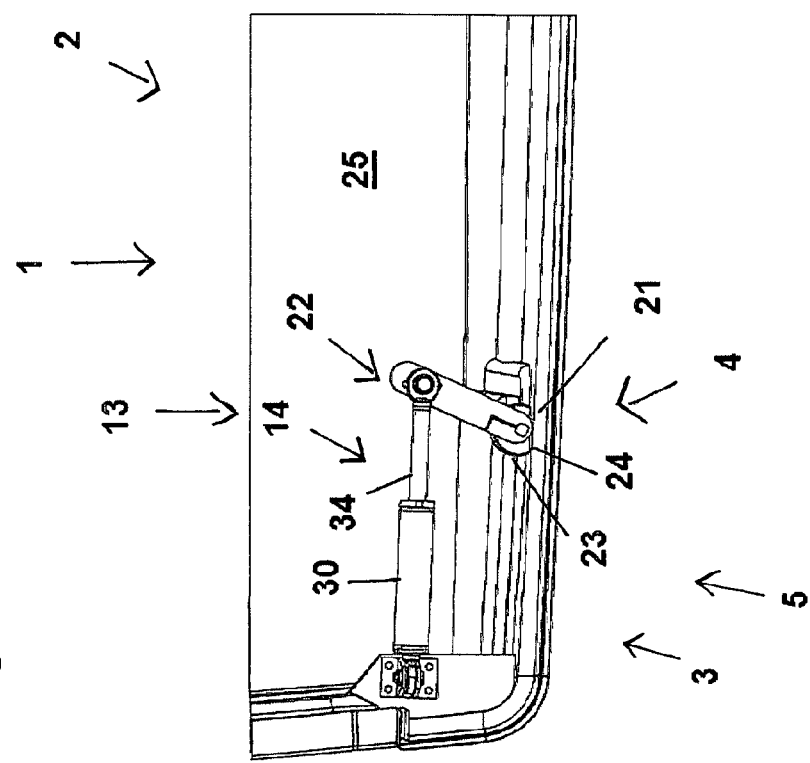
FIG. 6b shows a device for producing a stern wave with hull of a boat.

FIG. 6b shows a device according to the invention in the hull region 4 at stern 5 with pivoting deflector 3, which is to be operated through the hull region 4 through the actuating means13.

FIG. 7 shows a perspective view of a pivoting deflector 3 with an actuating means 13, which is to be arranged in an interior region of a boat hull, as for example in FIG. 6a,b.

LIST OF SIGNS 1 device
2 watercraft 3 pivoting deflector
4 hull region
5 stern
6 integration region
7 pivoted-in stage
8 hull outline
9 height
10 water line
10' water line
11 upper edge of the pivoting deflector
12 lower edge of the pivoting deflector
13 actuating means
14 linear cylinder
15 bellows cylinder
16 partial pivoting deflector
17 spacing region
18 upper edge of the hull region
19 pivoting angle
21 arrangement means
22 actuating joint means
23 actuating pass through
24 actuating range
25 interior region
26 hull surface
27 fastener
28 actuating bracket
29 pivoting deflector bracket
30 cylinder means
31 transition region
33 shaft
34 piston rod

The invention claimed is:

1. A device (1) for producing a stern wave on a watercraft (2), comprising:
   a pivoting deflector (3) which can be pivoted out laterally from a lateral hull region of a hull of the watercraft;
   a hinge (21) arranged on the lateral hull region (4) of the watercraft pivotally connecting the pivoting deflector to the watercraft;
   an integration region (6) for the pivoting deflector (3) in the lateral hull region (4) of the watercraft (2);
   an actuator (13) for lateral pivoting the pivoting deflector (3); and
   a sensor on the pivoting deflector (3) or on the actuator (13) for detecting an absolute value or a change of a force, a pivoting angle, a position, a path, or an inclination,
   wherein a stern wave for wakesurfing and/or wakeboarding can be formed by the pivoting deflector (3) in a pivoted-out state and
   wherein the pivoting deflector (3) is substantially integrated in the lateral hull region (4) of the watercraft (2) in a pivoted-in state (7) to adapt and/or continue a hull outer line (8) in the lateral hull region (4) of the watercraft (2).

2. The device according to claim 1, wherein the pivoting deflector (3) is fully integrated into the lateral hull region (4) when it is in pivoted-in state (7).

3. The device according to claim 1, wherein the pivoting deflector (3) is positioned at a lateral height (9) in such a way that a water line (10) at the lateral hull region (4) depends on height parameters essentially between an upper edge (11) of the pivoting deflector (3) and a lower edge (12) of the pivoting deflector (3).

4. The device according to claim 1, wherein the actuator is a linear cylinder (14), which is positioned at the hull and/or retractable into the hull.

5. The device according to claim 1, wherein the actuator is a volumetrically variable bellows cylinder (15) which is located at the lateral hull region (4).

6. The device according to claim 1, wherein the actuator is a piston (34) with an actuating joint (22) arranged in an interior region (25) of the watercraft (2) and an actuating pass through (23) for transmitting an operating range (24) of the actuator (13) through the integration region (6) of the pivoting deflector (3) in the lateral hull region (4) to the pivoting deflector (3).

7. The device according to claim 1, wherein the pivoting deflector (3) has at least two partial pivoting deflectors (16), with a spacing region (17) between the partial pivoting deflectors (16), arranged vertically and/or horizontally.

8. The device according to claim 1, wherein the pivoting deflector (3) comprises a solid and/or flexible material so that the pivoting deflector (3) is bendable to the outside.

9. The device according to claim 1, wherein the pivoting deflector (3) can be pivoted out at a pivoting angle (19) of up to about 45° or more than 45°.

10. The device according to claim 1, wherein an upper edge (11) of the pivoting deflector (3) is formed to approximately one upper edge (18) of the lateral hull region (4).

11. The device according to claim 1, wherein the sensor is a strain sensor or a photoelectric sensor or an angle sensor or a displacement sensor.

12. A method for producing a wave, comprising providing the device as in claim 1 to form a wakesurfing and/or wakeboarding wave on a moving watercraft.

13. A watercraft comprising the device according to claim 1.

14. A method for producing a stern wave on a watercraft (2) comprising:
   arranging a laterally pivoting deflector (3), with a hinge (22), on a lateral hull region (4) at the stern (5) of the watercraft;
   arranging an actuator (13) for lateral pivoting the pivoting deflector (3);
   detecting an absolute value or a change of a force, a pivoting angle, a position, a path, or an inclination of the pivoting deflector (3);
   arranging an integration zone (6) for the laterally pivoting deflector (3) in the lateral hull region (4) of the watercraft (2), so that the laterally pivoting deflector (3), when retracted, is essentially integrated into the lateral hull region (4) of the watercraft (2) and forms a continuation of a hull outline (8) in the lateral hull region (4) of the watercraft (2); and
   forming a stern wave for wakesurfing and/or wakeboarding by moving the watercraft with the laterally pivoting deflector (3) being extended.

* * * * *